(12) United States Patent
Bhakta et al.

(10) Patent No.: US 9,798,134 B2
(45) Date of Patent: Oct. 24, 2017

(54) SIDE-ILLUMINATED EXCITATION OPTICS APPARATUS AND SYSTEMS

(71) Applicant: TEXAS INSTRUMENTS INCORPORATED, Dallas, TX (US)

(72) Inventors: Vikrant R. Bhakta, Dallas, TX (US); Michael T. Davis, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 366 days.

(21) Appl. No.: 14/583,666

(22) Filed: Dec. 27, 2014

(65) Prior Publication Data
US 2016/0187644 A1 Jun. 30, 2016

(51) Int. Cl.
*G02B 27/20* (2006.01)
*F21V 7/00* (2006.01)
(Continued)

(52) U.S. Cl.
CPC ....... *G02B 26/0833* (2013.01); *G02B 5/1861* (2013.01); *G02B 26/008* (2013.01); *G02B 27/0927* (2013.01); *H04N 9/3158* (2013.01); *F21V 3/0481* (2013.01); *F21V 7/22* (2013.01); *G02B 5/1842* (2013.01); *G02B 6/0016* (2013.01); *G02B 27/2264* (2013.01); *G02B 2207/113* (2013.01); *G03B 21/008* (2013.01);
(Continued)

(58) Field of Classification Search
CPC ... G09G 2300/0452; G09G 2320/0646; G09G 3/3406; G09G 3/3413; G09G 3/3433; G09G 3/3607; G09G 3/2003; G09G 5/026; F21V 3/0481; F21V 7/22; G03B 21/204; G03B 21/008; G03B 21/2033; G03B 21/00; G03B 21/28; G03B 33/06; H04N 9/3152; H04N 9/3111; H04N 9/3161; H04N 9/3129; H04N 9/3155; H04N 9/3158; H04N 9/315; H04N 9/3182; H04N 9/735; H04N 5/225; H04N 9/04; H04N 13/0257; H04N 9/31; H04N 13/0497; H04N 2005/7483; H04N 5/3765; H04N 5/7458; H04N 9/67; H04N 9/3164; H04N 13/0422; G02B 26/0833; G02B 2207/113; G02B 27/2264; G02B 5/1842; G02B 6/0016
USPC ............ 353/31, 37; 313/498, 483, 502–504; 382/307, 325; 345/32, 33, 48, 55, 58, 81, 345/84, 85, 99, 108, 690; 362/259, 362/296.01, 297, 300, 19, 583, 84; 359/292, 351, 459, 460, 455–457
See application file for complete search history.

(56) References Cited

U.S. PATENT DOCUMENTS

2012/0242912 A1* 9/2012 Kitano ................. H04N 9/3111
348/759
2014/0226301 A1 8/2014 Khan

* cited by examiner

*Primary Examiner* — Evelyn A Lester
(74) *Attorney, Agent, or Firm* — Michael A. Davis, Jr.; Charles A. Brill; Frank D. Cimino (57) ABSTRACT

One or more excitation energy sources emit light in an excitation spectrum and direct the emitted light as an excitation beam to the emitting surface of a wavelength conversion element directly or via reflection. Distinct areas of the emitting surface are coated with one or more distinct fluorescent phosphors. The phosphor-coated areas receive the excitation beam and generate a sequence of fluoresced light beams at a light output, each fluoresced beam of a narrow spectrum determined by the type of phosphor and the excitation spectrum. The fluoresced beams travel parallel to an emitting axis at a non-zero angle to axes associated with the excitation beams.

19 Claims, 8 Drawing Sheets

(51) Int. Cl.

| | |
|---|---|
| *G02B 26/08* | (2006.01) |
| *G02B 26/00* | (2006.01) |
| *G02B 5/18* | (2006.01) |
| *G02B 27/09* | (2006.01) |
| G03B 21/20 | (2006.01) |
| H04N 9/31 | (2006.01) |
| F21V 8/00 | (2006.01) |
| F21V 7/22 | (2006.01) |
| G09G 5/02 | (2006.01) |
| G02B 27/22 | (2006.01) |
| G09G 3/36 | (2006.01) |
| G09G 3/34 | (2006.01) |
| G09G 3/20 | (2006.01) |
| F21V 3/04 | (2006.01) |
| G03B 21/00 | (2006.01) |
| H04N 5/74 | (2006.01) |
| H04N 5/225 | (2006.01) |
| H04N 13/04 | (2006.01) |
| G03B 21/28 | (2006.01) |
| H04N 9/04 | (2006.01) |
| G03B 33/06 | (2006.01) |
| H04N 9/73 | (2006.01) |
| H04N 9/67 | (2006.01) |
| H04N 13/02 | (2006.01) |
| H04N 5/376 | (2011.01) |

(52) U.S. Cl.
CPC ........ *G03B 21/204* (2013.01); *G03B 21/2033* (2013.01); *G03B 21/28* (2013.01); *G03B 33/06* (2013.01); *G09G 3/2003* (2013.01); *G09G 3/3406* (2013.01); *G09G 3/3413* (2013.01); *G09G 3/3433* (2013.01); *G09G 3/3607* (2013.01); *G09G 5/026* (2013.01); *G09G 2300/0452* (2013.01); *G09G 2320/0646* (2013.01); *H04N 5/225* (2013.01); *H04N 5/3765* (2013.01); *H04N 5/7458* (2013.01); *H04N 9/04* (2013.01); *H04N 9/31* (2013.01); *H04N 9/315* (2013.01); *H04N 9/3111* (2013.01); *H04N 9/3129* (2013.01); *H04N 9/3152* (2013.01); *H04N 9/3155* (2013.01); *H04N 9/3161* (2013.01); *H04N 9/3164* (2013.01); *H04N 9/3182* (2013.01); *H04N 9/67* (2013.01); *H04N 9/735* (2013.01); *H04N 13/0257* (2013.01); *H04N 13/0422* (2013.01); *H04N 13/0497* (2013.01); *H04N 2005/7483* (2013.01)

SIDE-ILLUMINATED EXCITATION OPTICS APPARATUS AND SYSTEMS

TECHNICAL FIELD

Embodiments described herein relate to apparatus and systems associated with solid state illumination, including illumination associated with image projection.

BACKGROUND INFORMATION

For modern systems of illumination, whether illumination associated with ambient lighting, image capture, image projection, image viewing, signage illumination and/or projection, etc. it is often desirable to generate light with one or more narrow band spectral components. In particular, it is often desirable to generate narrow band spectra corresponding to one or more of the additive primary-color components red ("R"), green ("G") and blue ("B") and/or spectra corresponding to one or more of the subtractive color components magenta ("M"), cyan ("C") and yellow ("Y"). A full set of narrow band spectra corresponding to the primary colors may be color-balanced to create white light. White light may in turn be filtered to create any other color.

Another example use of a set of primary colors of light is the time-sequencing of each primary color onto a digital micro-mirror device ("DMD") associated with a Texas Instruments Incorporated Digital Light Processing ("DLP")™ projection system. Each micro-mirror of a two-dimensional matrix of micro-mirrors on the DMD surface may be separately re-positioned at the start of each primary color time slot to reflect a single pixel of the current primary color into or away from an optical projection system. Doing so produces a projected two-tone pixel image of the current primary color. A series of such two-tone pixel images projected while rapidly sequencing between primary colors are integrated by the human eye to create the illusion of full-color image frames seen as a still or moving picture.

Many systems of illumination require significant light power expressed in lumens. In turn, energy efficiency standards often dictate minimum light generation efficiency expressed in lumens of output light power per watt of electrical input power. Laser light is potentially powerful and efficient to generate. In particular, blue light emitted at approximately 448 nm and ultraviolet ("UV") light emitted at approximately 405-420 nm are energetic and can be generated by lasers at high efficiencies. To take advantage of this phenomenon and to engineer simpler multi-spectrum illumination systems, light from one or more blue or UV lasers may be used to excite one or more luminescent phosphors coating one or more portions of a surface of a wavelength conversion element such as a phosphor wheel. Various phosphors are available, each capable of luminescing in a particular narrow spectrum when excited by a particular narrow band excitation spectrum of light. This technique may be used to create multiple primary colors from a low etendue, narrow band excitation light source such as a laser.

Figure 1:
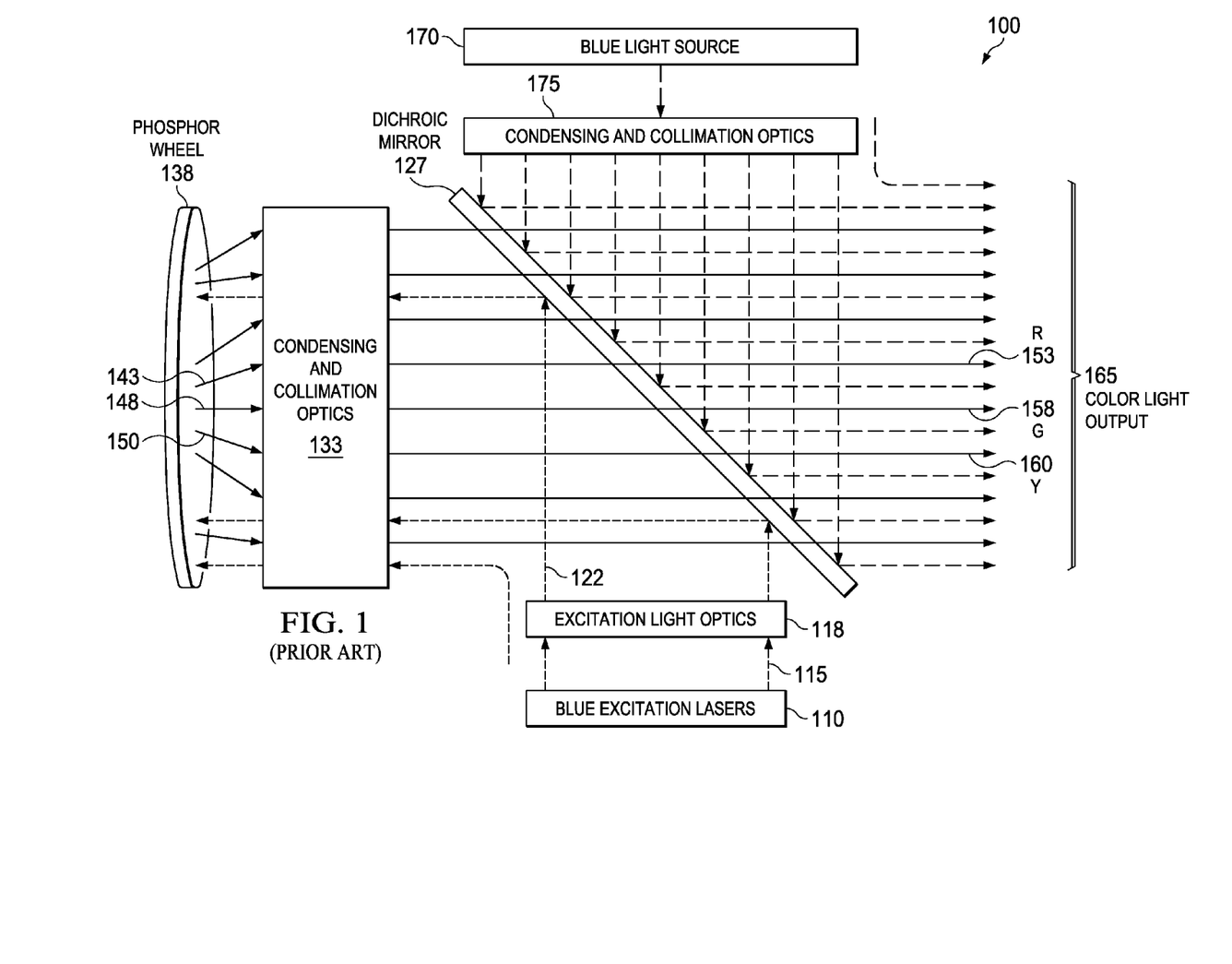
FIG. 1 is a prior-art schematic diagram of a multi-wavelength light generation apparatus using a low etendue, narrow band excitation light source.

FIG. 1 is a prior-art schematic diagram of a multi-wavelength light generation apparatus 100 using a low etendue, narrow band excitation light source. The apparatus 100 includes one or more blue light excitation lasers 110 to generate light 115 of the excitation spectrum. The light 115 is collected and collimated in an excitation light lens group 118 to generate an excitation beam 122. The excitation beam 122 is reflected by a dichroic mirror 127 through condensing and collimation optics group 133 and onto a surface of a phosphor wheel 138. Each of various phosphors coated onto various areas of the surface of the phosphor wheel 138 luminesces in a predetermined fluoresced spectrum of light as it is illuminated by the excitation beam 122.

It is noted that the various phosphor-coated areas may be exposed to the excitation beam 122 at different times by locating the areas radially around the wheel surface and rotating the wheel. Doing so may desirably temporally separate the output colors. Each resulting fluoresced spectrum of light emanating from the phosphor wheel 138 (e.g., as represented by light rays 143, 148, and 150) corresponds to a desired output color (e.g., R 153, G 158 and Y 160). The phosphor-emitted light is collected and collimated by the optics group 133 and are passed to the output 165 through the dichroic mirror 127.

One problem with using a dichroic mirror to separate light of the excitation spectrum from light of the fluoresced spectrum is that it may be desirable to include light of a color corresponding to the excitation spectrum (e.g., blue) at the output 165. The latter cannot be accomplished by simply reflecting light of the excitation spectrum from the phosphor wheel surface, because the dichroic mirror is designed to reflect and not pass light of the excitation spectrum. Consequently, such a dichroic mirror-based system may include a separate light source 170 to generate light of a color corresponding to the excitation spectrum. A dichroic mirror-based system may also include an associated optical group 175 on the side of the dichroic mirror 127 opposite the excitation energy source 110. The blue light source 170 emits light of the excitation spectrum at the output 165. Such additional components add cost and complexity.

Figure 2:
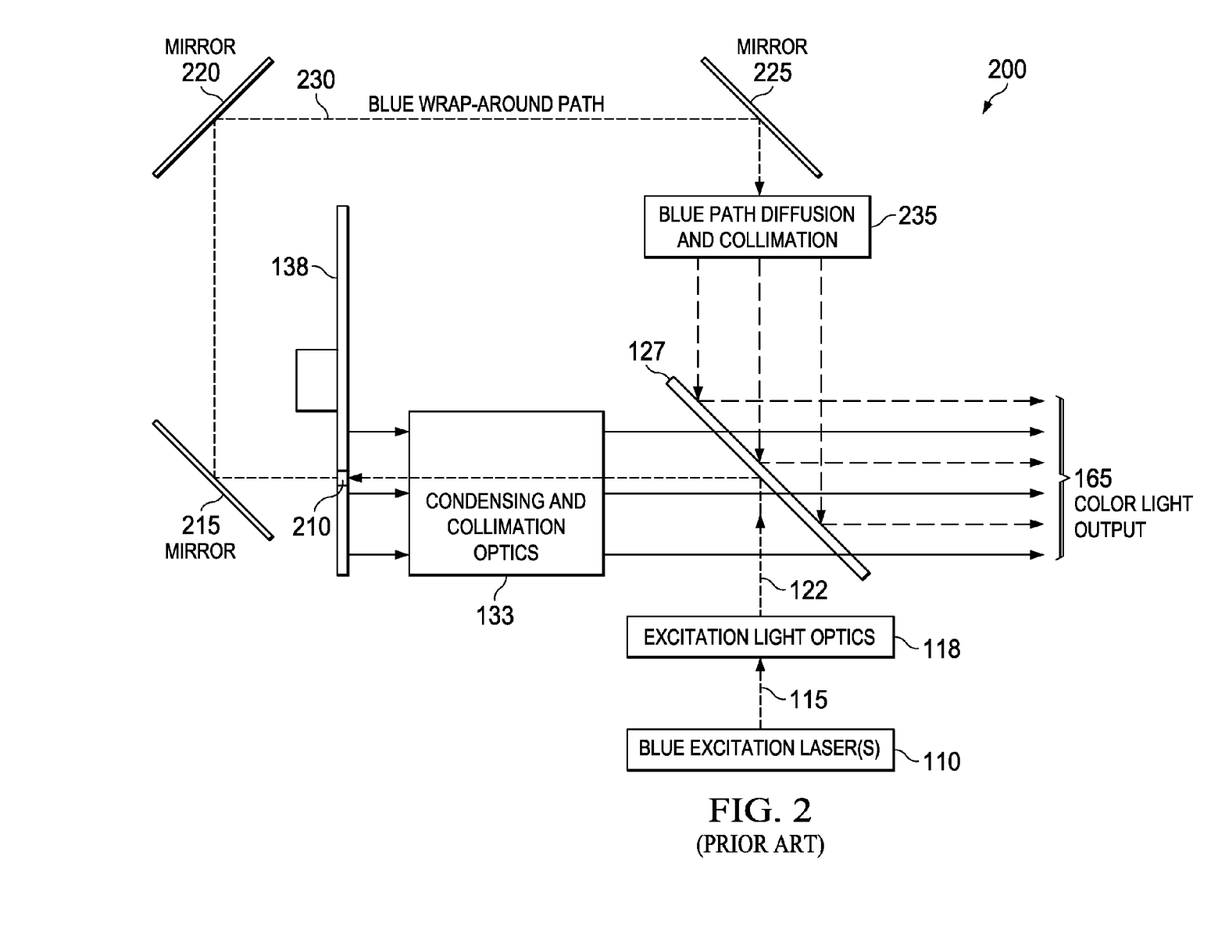
FIG. 2 is a prior-art schematic diagram of a multi-wavelength light generation apparatus using a low etendue, narrow band excitation light source.

FIG. 2 is a prior-art schematic diagram of a multi-wavelength light generation apparatus 200 using a low etendue, narrow band excitation light source. The apparatus 200 includes one or more blue light excitation lasers 110, light 115, excitation light lens group 118, excitation beam 122, dichroic mirror 127, condensing and collimation optics group 133, phosphor wheel 138 and output 165, all as described above with reference to FIG. 1. However, the apparatus 200 also includes an opening 210 in the phosphor wheel (e.g., a slot along a radius) to pass light of the excitation spectrum (e.g., blue) at a time when the color corresponding to the excitation spectrum is desired. A series of mirrors (e.g., the mirrors 215, 220 and 225) create a "wrap-around" path 230 to direct light of the excitation spectrum to an optical group 235 associated with the wrap-around path 230. Collimated light of the excitation spectrum is subsequently reflected by the dichroic mirror 127 to the output 165. The wrap-around path 230 may increase the overall size of the apparatus 200.

SUMMARY OF THE INVENTION

Structures herein generate sequenced beams of colored light emitted and/or reflected from an emitting surface of an optical wavelength conversion element such as a phosphor-coated wheel. The emitted and/or reflected beams of colored light propagate from the emitting surface of the wavelength conversion element parallel to an axis perpendicular to the emitting surface (the "emitting axis"). One or more excitation energy sources of high-energy, low etendue, narrow band light emit beams ("excitation beams." The term "beam" as used herein means a beam of light. Each excitation source emits light in a narrow spectrum referred to herein as the "excitation spectrum." Examples of such excitation light sources include a blue or UV laser, a blue LED, or an array of lasers and LEDs with beam focusing elements. Each excitation beam travels parallel to an excitation axis at a non-zero angle to the emitting axis. The excitation beams are focused onto one or more areas of the emitting surface of the optical wavelength conversion element. Some embodiments of the excitation energy sources include top-hat beam shapers to homogenize light from an emitting element to more evenly distribute the energy of the excitation beam across the area of the excitation beam at the emitting surface of the optical wavelength conversion element.

Some area(s) of the emitting surface are coated with one or more types of phosphor, each designed to fluoresce in a particular narrow band spectrum of light ("fluoresced spectrum") when excited by the excitation beam. Phosphor coated surfaces of the optical wavelength conversion element thus effectively convert light energy of the excitation spectrum to light energy of the fluoresced spectrum. Some embodiments herein may include switchable Bragg filters to filter unconverted light of the excitation spectrum from the fluoresced output beam. Some embodiments include areas of the emitting surface reflective to light of the excitation spectrum. The reflective areas serve the purpose of including a color of light of the excitation spectrum in the sequence of output beams. The reflective areas may be coated or etched with a dispersive surface to scatter the reflected light and to thus better spatially distribute the energy content of the reflected excitation beam.

For purposes herein, the term "emitting surface" shall mean an entire surface of the optical wavelength conversion element including phosphor-coated and reflective areas. One entire side of a phosphor-coated wheel, for example, is referred to herein as the "emitting surface." A particular area of the emitting surface may be phosphor coated, reflective, or neither. Likewise the term "emitting axis" as used herein refers to any axis perpendicular to the emitting surface.

Systems described herein synchronize and sequence the different colors of output light with the operation of a DMD to generate a multi-colored or full-color pixel image.

DETAILED DESCRIPTION

Figure 3:
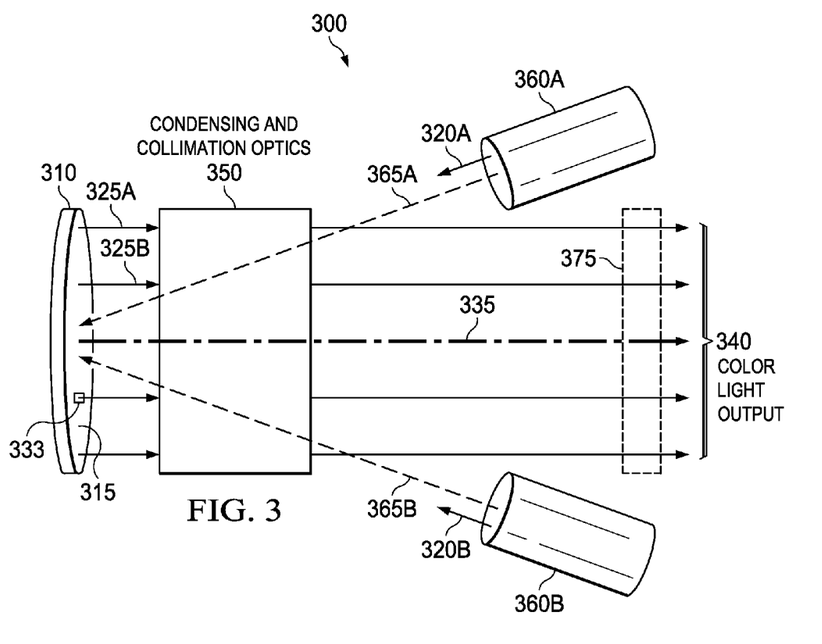
FIG. 3 is a schematic diagram of a low etendue, narrow band excitation light source illumination apparatus according to various embodiments of the invention.

FIG. 3 is a schematic diagram of a low etendue, narrow band excitation light source illumination apparatus 300 according to various embodiments of the invention. The illumination apparatus 300 includes an optical wavelength conversion element 310. The wavelength conversion element 310 may of any shape and may be capable of rotation or may be designed to be stationary. In some embodiments, the optical wavelength conversion element 310 of the apparatus 300 may be a wheel capable of spinning as further described below. One or more portions of an emitting surface 315 of the wavelength conversion element 310 is coated with a fluorescent phosphor. Two or more portions of the surface 315 may be coated with different phosphors, each designed to fluoresce in a different narrow band spectrum when illuminated with an excitation beam of light of an excitation spectrum. For example, the phosphors may be designed to fluoresce in spectra corresponding to two or more of the primary colors red, green blue, cyan, magenta, and/or yellow. Doing so and combining the fluoresced colors with a color corresponding to the excitation spectrum may produce white light when integrated by the human eye. Control of the intensity of each primary color on a pixel by pixel basis may enable full-color image projection as further described below.

Phosphor(s) coated on the wavelength conversion element 310 receive one or more excitation beams of photons (e.g., the excitation beams 320A and 320B) of the excitation spectrum. The excitations beams may, for example, consist of high-energy blue or UV light. The phosphor-coated wavelength conversion element 310 generates one or more fluoresced beams of photons (e.g., the beams 325A and 325B), each of a particular narrow fluoresced spectrum corresponding to the type of phosphor being illuminated by the excitation beam at a particular time. Each fluoresced beam is generated by the wavelength conversion element 310 with a predetermined periodicity during one or more predetermined periods of time.

Figure 4A:
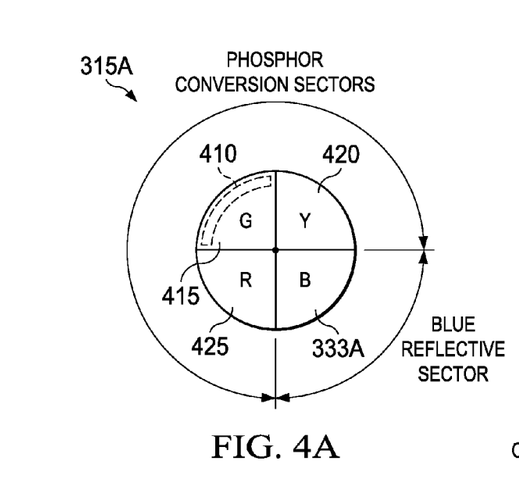
FIG. 4A is a diagram of a phosphor coated wheel surface according to various example embodiments.
Figure 4B:
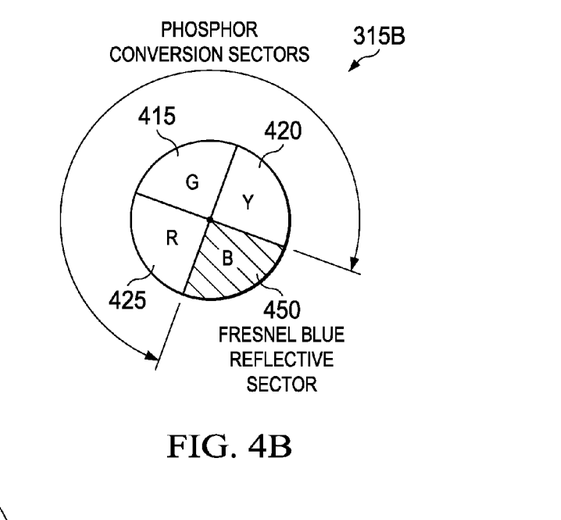
FIG. 4B is a diagram of a phosphor coated wheel surface according to various example embodiments.
Figure 4C:
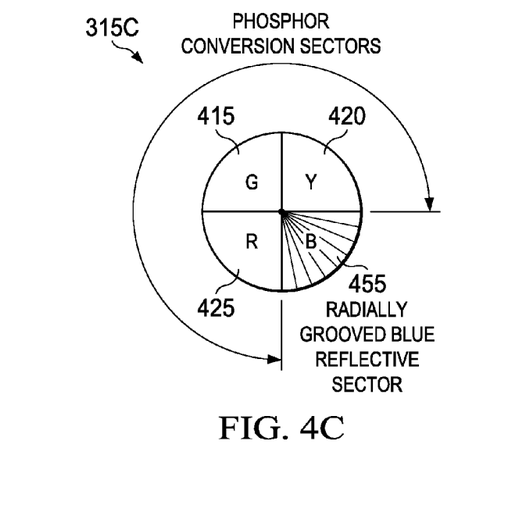
FIG. 4C is a diagram of a phosphor coated wheel surface according to various example embodiments.

FIGS. 4A, 4B, and 4C are diagrams of the wavelength conversion element 310 embodied as a phosphor coated wheel and the emitting surface 315 embodied as wheel surfaces 315A, 315B and 315C respectively. One or more portions (e.g., the portion 410) of one or more radial sectors (e.g., the radial sector 415) of the wheel surfaces 315A, 315B, and 315C are coated with the fluorescent phosphor to emit the fluoresced beam of photons. Some versions of phosphor wheel surfaces 315A, 315B, and 315C may have a portion or the entire area of two or more radial sectors coated with different fluorescent phosphors. Each emits a fluoresced beam of a corresponding fluoresced spectrum when illuminated by the excitation beam 320. (E.g., the radial sectors 415 or the portion 410 thereof are coated with a phosphor to emit green wavelengths, the radial sectors 420 or portions thereof are coated with a phosphor to emit yellow wavelengths, and the radial sectors 425 or portions thereof are coated with a phosphor to emit red wavelengths). Each coated surface emits its corresponding fluoresced beam with a periodicity and for a period of time dependent upon an arc length (e.g., the arc length of the portion 410) and the angular velocity of the coated surface while being illuminated by the excitation beam.

The surface 315 of the wavelength conversion element 310 also includes one or more areas 333 reflective to light of the excitation spectrum (e.g., wavelengths corresponding to the output color blue in this example case). The reflective areas 333 direct a beam of the reflected light back parallel to an emitting axis 335 to an output 340 of the apparatus 300. For example, the reflective areas may include one or more portions of one or more radial sectors (e.g., the radial sector 333A of FIG. 4A) of a phosphor wheel embodiment of the wavelength conversion element 310.

In some embodiments, the reflective area 333 of the surface 315 may be coated with a reflective coating. The reflective area 333 may also be fabricated with a set of microstructures to disperse the reflected portion of the excitation beam across a greater angle outward from the reflective surface than would be the angle of dispersion without the microstructures. Such microstructures may include a Fresnel grating 450 as shown in FIG. 4B or a set of radial grooves 455 as shown in FIG. 4C, for example.

Referring back to FIG. 3, the illumination apparatus 300 also includes a condensing and collimation optical element group 350 optically coupled to the optical wavelength conversion element 310. The optical element group 350 directs the fluoresced beam parallel to the emitting axis 335 perpendicular to the emitting surface 315.

The illumination apparatus 300 further includes one or more electromagnetic excitation energy sources (e.g., the excitation sources 360A and 360B). The excitation energy sources are optically coupled to the optical wavelength conversion element 310 to generate light in the excitation spectrum. The excitation energy sources also direct the light as excitation beams (e.g., the beams 320A and 320B) to the emitting surface 315 directly or via reflection parallel to one or more excitation axes (e.g., the axes 365A and 365B) at a non-zero angle to the emitting axis 335. In some embodiments, an array of excitation energy sources (e.g., as represented by the excitation sources 360A and 360B) may be positioned around the emitting axis 335. In some embodiments, the excitation energy sources may be lasers or other low etendue narrow band light-generating devices. Additional embodiments of the excitation energy sources and components thereof are further described below.

The illumination apparatus 300 may also include a switchable Bragg grating 375. The switchable Bragg grating 375 passes light of a color (e.g., blue) corresponding to the excitation spectrum during predetermined time periods when such color is desired at the output 340. For example, when the wavelength conversion element 310 and/or the excitation beam are positioned such that the excitation beam is directed to the reflective area 333, the switchable Bragg grating 375 is switched to pass blue light. Conversely, the switchable Bragg grating 375 is switched to reflect light corresponding to the excitation spectrum during predetermined time periods when fluoresced spectra are expected at the output 340. That is, the switchable Bragg grating 375 blocks light of the excitation spectrum when the wavelength conversion element 310 and/or the excitation beam are positioned such that the excitation beam is directed to an phosphor-coated area. Doing so prevents color corruption caused by unconverted excitation energy (corresponding to the color blue, for example) passing into a non-blue output beam.

Figure 5:
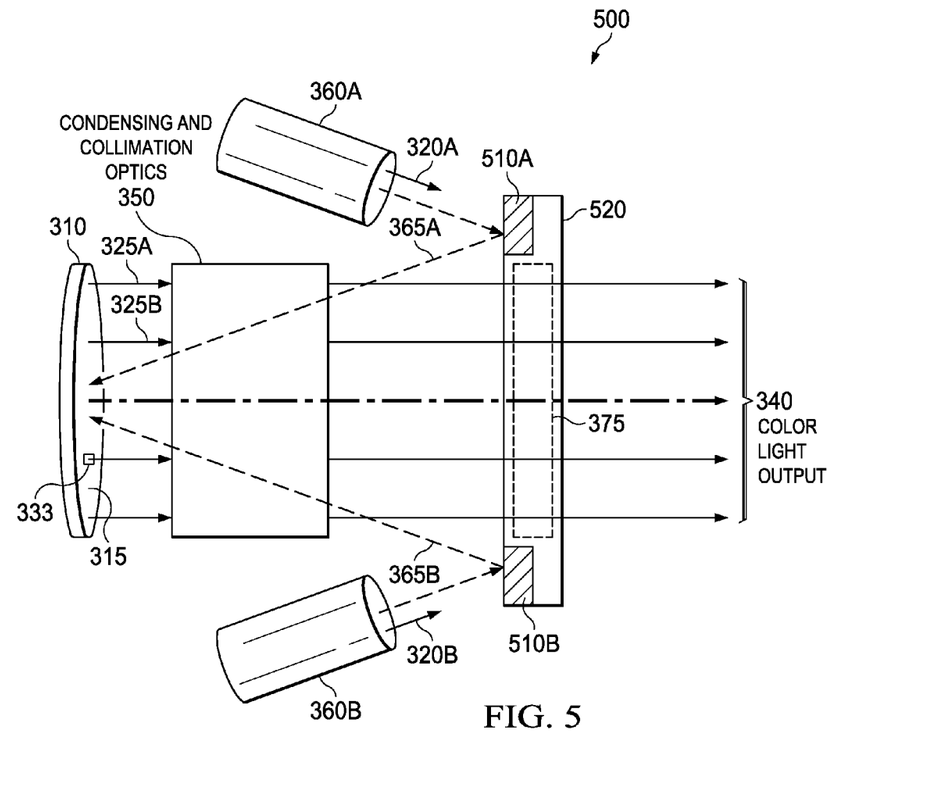
FIG. 5 is a schematic diagram of a low etendue, narrow band excitation light source illumination apparatus according to various embodiments.

FIG. 5 is a schematic diagram of a low etendue, narrow band excitation light source illumination apparatus 500 according to various embodiments. The excitation illumination apparatus 500 includes the optical wavelength conversion element 310, the emitting surface 315, the example excitation beams 320A and 320B, the example fluoresced beams of photons 325A and 325B, the one or more reflective areas 333, the emitting axis 335, the output 340, the condensing and collimation optical element group 350, the example excitation energy sources 360A and 360B, and the example excitation axes 365A and 365B as previously described with reference to the excitation illumination apparatus 300 of FIG. 3.

The illumination apparatus 500 also includes one or more reflectors (e.g., the reflectors 510A and 510B) optically coupled to the excitation energy sources. The reflectors direct each excitation beam from a corresponding excitation energy source to the emitting surface 315 parallel to a corresponding excitation axis (e.g., the axes 365A and 365B). By "folding" the excitation beams, the reflectors may enable a more compact location of the excitation energy sources.

In some embodiments, the reflectors may be fabricated using a transmissive plate 520 with a reflective coating along a periphery of the plate 520. The reflective coating reflects light of wavelengths corresponding to the excitation spectrum. In some embodiments, a transmissive portion 530 of the transmissive plate 520 may be fabricated using a switchable Bragg grating 375 as previously described with reference to the illumination apparatus 300 of FIG. 3.

Figure 6:
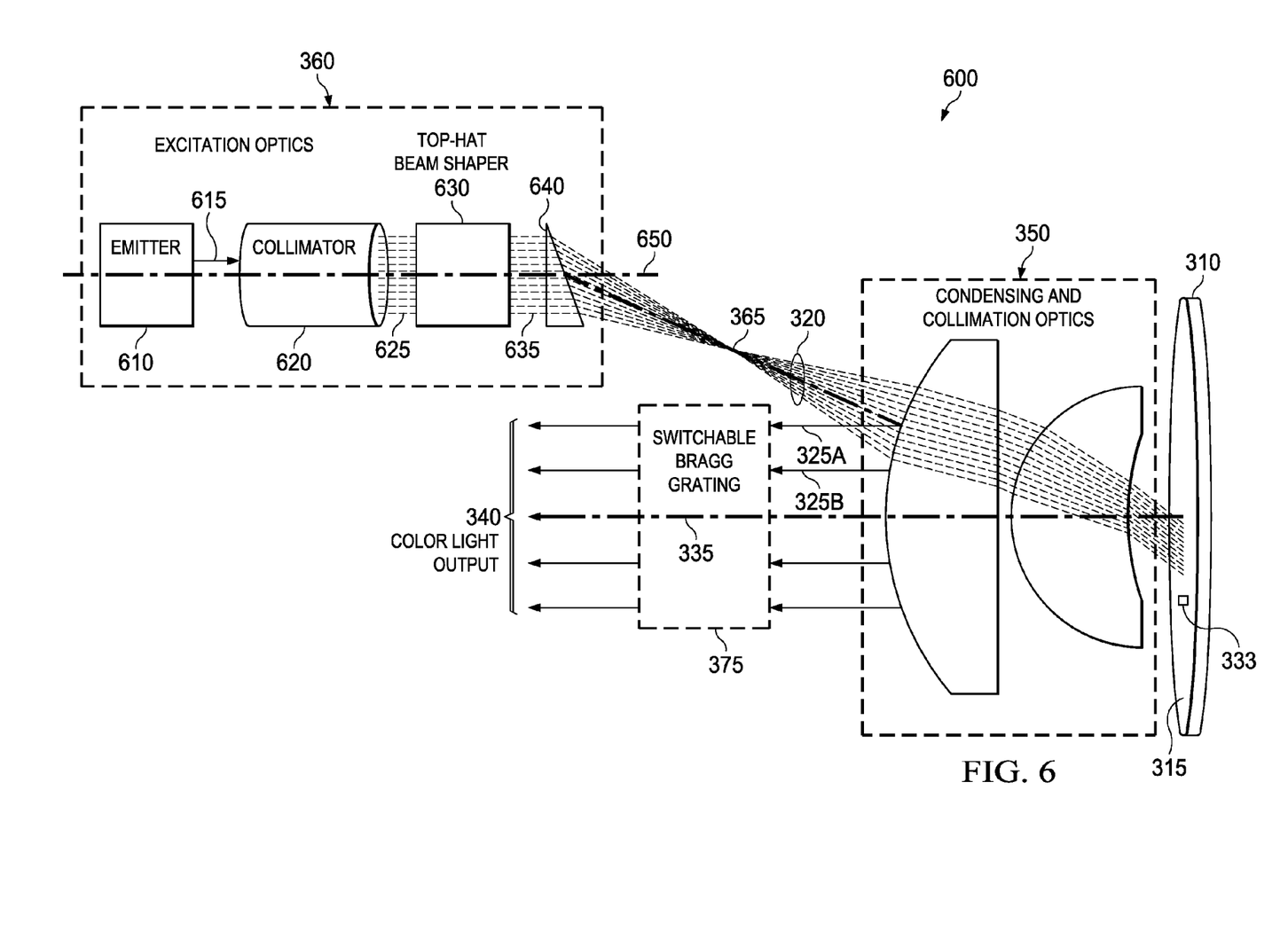
FIG. 6 is a schematic diagram of a low etendue, narrow band excitation light source illumination apparatus according to various embodiments.

FIG. 6 is a schematic diagram of a low etendue, narrow band excitation light source illumination apparatus 600 according to various embodiments. The illumination apparatus 600 includes the optical wavelength conversion element 310, the emitting surface 315, the example excitation beams 320, the example fluoresced beams of photons 325A and 325B, the one or more reflective areas 333, the emitting axis 335, the output 340, the condensing and collimation optical element group 350, the example excitation energy source 360, the example excitation axis 365, and the optional switchable Bragg grating 375 as previously described with reference to the excitation illumination apparatus 300 of FIG. 3.

The excitation energy source 360 includes an emitter 610 to generate light 615 of the excitation spectrum. The emitter 610 is a low etendue, narrow band light source such as a laser or other source of high-energy (e.g., blue or UV), narrow wavelength light. In some embodiments, the excitation energy source 360 also includes a collimator 620 optically coupled to the emitter 610. The collimator 620 receives and collimates the light 615 generated by the emitter 610.

In some embodiments, the excitation energy source further includes a top-hat beam shaper 630 optically coupled to the collimator 620. The top-hat beam shaper 630 may be implemented with an optical diffuser, an analytical aspheric lens, or a light pipe, for example. The top-hat beam shaper 630 receives collimated light 625 from the collimator 620 and optically homogenizes the collimated light 625, resulting in a top-hat spatially distributed beam 635.

Figure 7A:
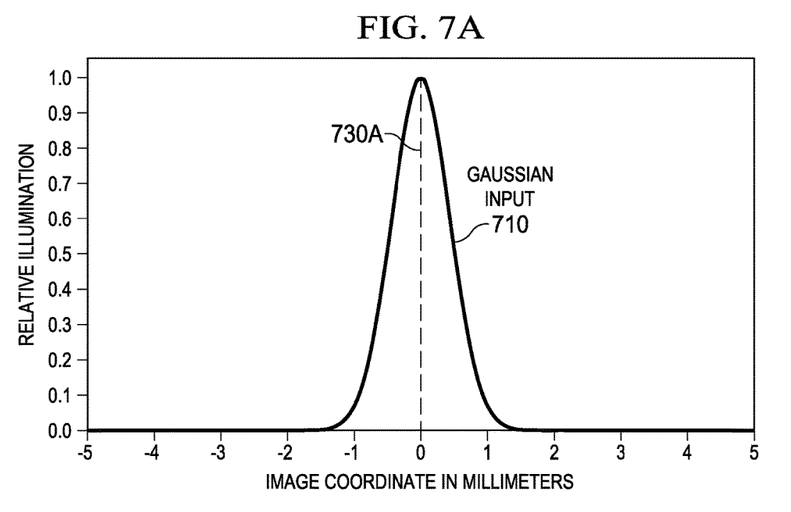
FIG. 7A is an illumination distribution plot illustrating a Gaussian illumination distribution associated with a low etendue, narrow band excitation light source illumination apparatus according to various embodiments.
Figure 7B:
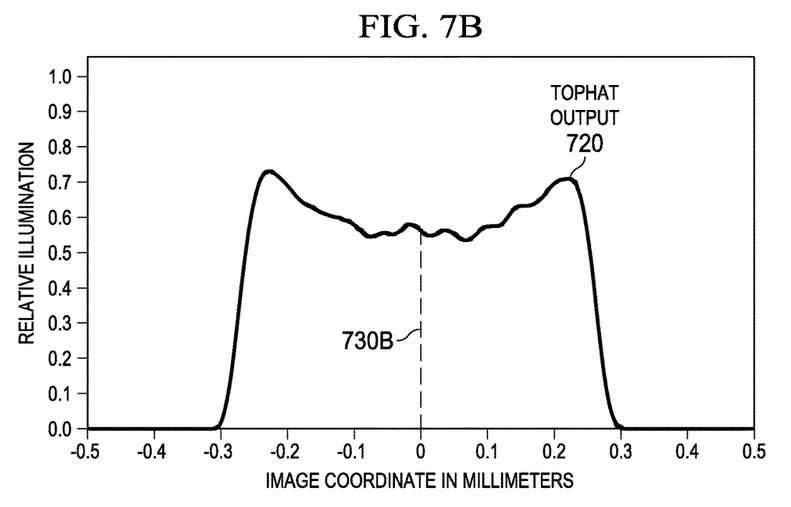
FIG. 7B is an illumination distribution plot illustrating a top-hat illumination distribution associated with a low etendue, narrow band excitation light source illumination apparatus according to various embodiments.

FIGS. 7A and 7B are illumination distribution plots illustrating a Gaussian spatial distribution 710 and a top-hat spatial distribution 720, respectively. The Gaussian and top-hat spatial distribution plots 710 and 720 are associated with the illumination apparatus 600 according to various embodiments. The plots 710 and 720 show relative illumination on the vertical axis as a function of the distance from the centers 730A and 730B of beams of the light 625 and 635, respectively. For purposes herein, relative illumination is defined as irradiance normalized to peak irradiance. The point of peak irradiance may or may not be at the beam center. A beam of the emitted light 615 may be characterized as having a substantially Gaussian spatial distribution across the beam width and having a substantially Gaussian spectral distribution across a narrow excitation spectrum. Turning back to FIG. 6, the top-hat beam shaper 630 converts the spatial distribution of the collimated light 625 from the substantially Gaussian distribution generated by the emitter 610 to the substantially top-hat distributed beam 635.

The excitation energy source 360 may be oriented to direct the excitation beam 320 to a desired area of the condensing and collimating optics group 350 and thus to a desired area of the optical wavelength conversion element 310. Alternatively or in addition, some embodiments of the excitation energy source 360 may also include a deflecting lens 640 optically coupled to the top-hat beam shaper 630. The deflecting lens 640 re-directs the excitation beam 320 from an axis 650 associated with the excitation energy source to the excitation axis 365.

Some embodiments such as the apparatus 300 and 500 include multiple excitation energy sources 360 as previously described. In addition to including the top-hat beam shaper 630 or in lieu thereof, such embodiments may direct the excitation beams of the various excitation energy sources to overlapping spots of the emitting surface 315 of the wavelength conversion element 310. Doing so may enhance the energy distribution across the cumulative excitation area formed by the multiple excitation beams.

Figure 8:
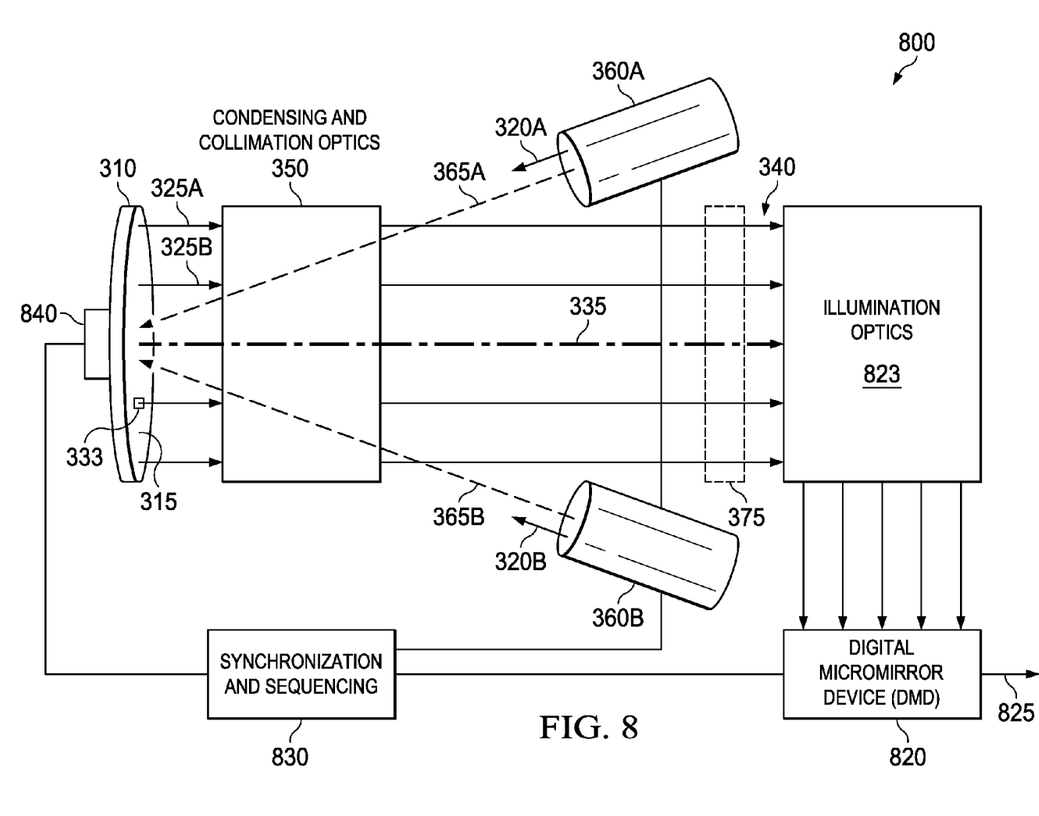
FIG. 8 is a schematic block diagram of an image generation system according to various embodiments.

FIG. 8 is a schematic block diagram of an image generation system 800 according to various embodiments. The image generation system 800 includes the optical wavelength conversion element 310, the emitting surface 315, the example excitation beams 320A and 320B, the example fluoresced beams of photons 325A and 325B, the one or more reflective areas 333, the emitting axis 335, the output 340, the condensing and collimation optical element group 350, the example excitation energy sources 360A and 360B, and the example excitation axes 365A and 365B as previously described with reference to the excitation illumination apparatus 300 of FIG. 3.

Some embodiments of the excitation energy sources may include the emitter 610, the collimator 620, the top-hat beam shaper 630 and/or the beam deflection lens 640 as previously described with reference to the illumination apparatus 600 of FIG. 6. Some embodiments of the image generation system 800 may also include a switchable Bragg grating 375 as previously described with reference to the apparatus 300 of FIG. 3. Some embodiments of the image generation system 800 may include "beam folding" components such as the reflectors 510A and 510B and the transmissive plate 520 previously described with reference to the apparatus 500 of FIG. 5.

The image generation system 800 further includes a digital micro-mirror device ("DMD") 820 optically coupled to the condensing and collimation optical element group 350. Some embodiments of the image generation system 800 may include an illumination optical element group 823. The illumination optical element group 823 is optically coupled to the condensing and collimation optical element group to transfer the fluoresced beam to the DMD 820.

The DMD 820 includes a two-dimensional set of micro mirrors to receive the fluoresced beam and to create a pixel image primary color frame. The DMD 820 creates the pixel image by directing a portion of the fluoresced beam corresponding to each mirror into or away from a pixel image output path 825. Directing a mirrored portion of the beam into the pixel image output path 825 generates a bright pixel of a color corresponding to the fluoresced spectrum. Directing a mirrored portion of the beam away from the pixel image output path 825 generates a dark pixel.

The image generation system 800 also includes a synchronization and sequencing circuit 830 communicatively coupled to the wavelength conversion element 310 and to the DMD 820. The synchronization and sequencing circuit 830 synchronizes the periodicity and on time of each fluoresced beam of a given narrow band spectrum with a state of the mirrors of the DMD 820 during the on time. The synchronization and sequencing circuit 830 also sequences multiple fluoresced beams to the DMD 820, each of a narrow band spectrum corresponding to a primary color. Synchronization and sequencing may be accomplished at the wavelength conversion element 310 by controlling a motor used to move or rotate the conversion element 310, and/or sensing position information associated with a current position of one or more portions of the surface 315 of the conversion element 310. Synchronization and sequencing may also be accomplished wholly or in part by controlling the on time and/or power of each of the excitation energy sources, either together or differentially.

The overall effect as perceived in an integrated form by the human eye is a time-multiplexed color pixel image. The color pixel image may be full-color as appropriate for television or movie projection, for example. However, some embodiments of the image generation system 800 may produce images of only a few colors as may be appropriate for signage, heads-up display projection and other such applications.

Apparatus and systems described herein may be useful in applications other than generating sequences of light beams of various colors from a low etendue, narrow band excitation source for image projection. The examples of the apparatus 300, 500 and 600 and the system 800 described herein are intended to provide a general understanding of the structures of various embodiments and the sequences of various methods. They are not intended to serve as complete descriptions of all elements and features of systems and methods that might make use of these example structures and sequences.

Structures herein generate sequenced output beams of colored light, one color at a time, generated from one or more low etendue, narrow band excitation light sources. The excitation light sources are positioned to generate the excitation beams off-axis from the output beams. Doing so may save costs and complexity as compared to prior-art devices utilizing dichroic mirrors, separate sources of light of the excitation spectrum to provide light of the excitation spectrum at the output, and components associated with wrap-around excitation beam paths.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. An illumination apparatus, comprising:
   an optical wavelength conversion element, at least one portion of an emitting surface of the wavelength conversion element coated with a fluorescent phosphor to receive at least one excitation beam of photons of an excitation spectrum and to generate at least one fluoresced beam of photons of a fluoresced spectrum with a predetermined periodicity during at least one predetermined period of time;
   a condensing and collimation optical element group optically coupled to the optical wavelength conversion element to direct the fluoresced beam parallel to an emitting axis perpendicular to the emitting surface; and
   at least one electromagnetic excitation energy source optically coupled to the optical wavelength conversion element to emit light of the excitation spectrum and to direct the emitted light as the excitation beam to the emitting surface of the wavelength conversion element directly or via reflection parallel to an excitation axis at a non-zero angle to the emitting axis;
   the excitation energy source further comprising: an emitter to emit the light of the excitation spectrum; a collimator optically coupled to the emitter to receive and collimate the emitted light; and a top-hat beam shaper optically coupled to the collimator to receive the emitted light and to homogenize the emitted light by converting an area distribution of the emitted light from a substantially Gaussian distribution to a substantially top-hat distribution, the top-hat beam shaper selected from a group of optical devices consisting of an optical diffuser, an analytical aspheric lens, and a light pipe.

2. The illumination apparatus of claim 1, the optical wavelength conversion element being a wheel capable of spinning, the emitting surface being a flat surface of the wheel, at least a portion of at least one of a plurality of radial sectors of the wheel surface coated with the fluorescent phosphor to emit the fluoresced beam of photons, the predetermined periodicity determined by an angular velocity of the phosphor-coated portion and the predetermined period of time determined by the arc length of the phosphor coated portion while illuminated by the excitation beam.

3. The illumination apparatus of claim 1, the emitter being a laser light source.

4. The illumination apparatus of claim 1, the excitation energy source further comprising:
   a deflecting lens optically coupled to the top-hat beam shaper to re-direct the excitation beam from an axis associated with the excitation energy source to the excitation axis.

5. An illumination apparatus, comprising:
   an optical wavelength conversion element, at least one portion of an emitting surface of the wavelength conversion element coated with a fluorescent phosphor to receive at least one excitation beam of photons of an excitation spectrum and to generate at least one fluoresced beam of photons of a fluoresced spectrum with a predetermined periodicity during at least one predetermined period of time;
   a condensing and collimation optical element group optically coupled to the optical wavelength conversion element to direct the fluoresced beam parallel to an emitting axis perpendicular to the emitting surface; and
   at least one electromagnetic excitation energy source optically coupled to the optical wavelength conversion element to emit light of the excitation spectrum and to direct the emitted light as the excitation beam to the emitting surface of the wavelength conversion element directly or via reflection parallel to an excitation axis at a non-zero angle to the emitting axis;
   the optical wavelength conversion element being a wheel capable of spinning, the emitting surface being a flat surface of the wheel, at least a portion of at least one of a plurality of radial sectors of the wheel surface coated with the fluorescent phosphor to emit the fluoresced beam of photons, the predetermined periodicity determined by an angular velocity of the phosphor-coated portion, the predetermined period of time determined by the arc length of the phosphor coated portion while illuminated by the excitation beam, and at least one portion of at least one radial sector being a reflective surface to direct a portion of the excitation beam of the excitation spectrum back parallel to the emitting axis.

6. The illumination apparatus of claim 5, the reflective portion of the radial sector fabricated with a set of microstructures selected from a group consisting of a Fresnel grating and a set of radial grooves, the set of microstructures to disperse the reflected portion of the excitation beam across a greater angle outward from the surface of the wheel than would be the angle of dispersion without the microstructures.

7. The illumination apparatus of claim 5, light of the fluoresced spectrum corresponding to at least one of red, green, blue, cyan, magenta, and yellow.

8. The illumination apparatus of claim 5, the at least one excitation energy source being an array of excitation energy sources positioned around the emitting axis.

9. The illumination apparatus of claim 5, the excitation energy source further comprising:
   an emitter to emit the light of the excitation spectrum and a collimator optically coupled to the emitter to receive and collimate the emitted light.

10. The illumination apparatus of claim 5, the reflective portion of the radial sector coated with a material reflective to light of the excitation spectrum.

11. The illumination apparatus of claim 5, each of at least two portions of the plurality of radial sectors coated with different fluorescent phosphors, each to emit a corresponding fluoresced beam of a corresponding fluoresced spectrum.

12. The illumination apparatus of claim 5, the light of the excitation spectrum corresponding to a color selected from a group consisting of blue and ultraviolet light.

13. The illumination apparatus of claim 5, further comprising:
at least one reflector optically coupled to the excitation energy source to direct the excitation beam from the excitation energy source to the emitting surface parallel to the excitation axis.

14. The illumination apparatus of claim 13, the reflector being a transmissive plate with a reflective coating along a periphery of the plate, the reflective coating to reflect light of wavelengths corresponding to the excitation spectrum.

15. An illumination apparatus, comprising:
an optical wavelength conversion element, at least one portion of an emitting surface of the wavelength conversion element coated with a fluorescent phosphor to receive at least one excitation beam of photons of an excitation spectrum and to generate at least one fluoresced beam of photons of a fluoresced spectrum with a predetermined periodicity during at least one predetermined period of time;
a condensing and collimation optical element group optically coupled to the optical wavelength conversion element to direct the fluoresced beam parallel to an emitting axis perpendicular to the emitting surface;
at least one electromagnetic excitation energy source optically coupled to the optical wavelength conversion element to emit light of the excitation spectrum and to direct the emitted light as the excitation beam to the emitting surface of the wavelength conversion element directly or via reflection parallel to an excitation axis at a non-zero angle to the emitting axis; and
at least one reflector optically coupled to the excitation energy source to direct the excitation beam from the excitation energy source to the emitting surface parallel to the excitation axis, the reflector being a transmissive plate with a reflective coating along a periphery of the plate, the reflective coating to reflect light of wavelengths corresponding to the excitation spectrum;
a transmissive portion of the transmissive plate being a switchable Bragg grating to pass the light of wavelengths corresponding to the excitation spectrum during first predetermined time periods and to reflect the light of wavelengths corresponding to the excitation spectrum during second predetermined time periods in order to prevent unconverted excitation energy from passing into an output beam during the second predetermined time periods.

16. An illumination apparatus, comprising:
an optical wavelength conversion element, at least one portion of an emitting surface of the wavelength conversion element coated with a fluorescent phosphor to receive at least one excitation beam of photons of an excitation spectrum and to generate at least one fluoresced beam of photons of at least one fluoresced spectrum with a predetermined periodicity during at least one predetermined period of time;
a condensing and collimation optical element group optically coupled to the optical wavelength conversion element to direct the fluoresced beam parallel to an emitting axis perpendicular to the emitting surface;
at least one electromagnetic excitation energy source optically coupled to the optical wavelength conversion element to emit light of the excitation spectrum and to direct the emitted light as the excitation beam to the emitting surface of the wavelength conversion element directly or via reflection parallel to an excitation axis at a non-zero angle to the emitting axis; and
a switchable Bragg grating optically coupled to the condensing and collimation optical element group to pass light of wavelengths corresponding to the excitation spectrum during first predetermined time periods and to reflect the light of wavelengths corresponding to the excitation spectrum during second predetermined time periods in order to prevent unconverted excitation energy from passing into an output beam during the second predetermined time periods.

17. An image generation system, comprising:
an optical wavelength conversion element, at least one portion of an emitting surface of the wavelength conversion element coated with a fluorescent phosphor to receive at least one excitation beam of photons of an excitation spectrum and to generate at least one fluoresced beam of photons of a fluoresced spectrum with a predetermined periodicity during at least one predetermined period of time;
a condensing and collimation optical element group optically coupled to the wavelength conversion element to direct the fluoresced beam parallel to an emitting axis perpendicular to the emitting surface;
at least one electromagnetic excitation energy source optically coupled to the optical wavelength conversion element to emit light of the excitation spectrum and to direct the emitted light as an excitation beam to the emitting surface of the wavelength conversion element directly or via reflection parallel to an excitation axis at a non-zero angle to the emitting axis;
a digital micro-mirror device ("DMD") optically coupled to the condensing and collimation optical element group, the DMD to include a two-dimensional set of micro mirrors to receive the fluoresced beam and to create a pixel image primary color frame by directing a portion of the fluoresced beam corresponding to each mirror into an image output path to generate a bright pixel of a color corresponding to the fluoresced spectrum or away from the image output path to generate a dark pixel; and
a synchronization and sequencing circuit communicatively coupled to the wavelength conversion element and to the DMD to synchronize the periodicity and on time of each fluoresced beam of a corresponding fluoresced spectrum with a state of the DMD during the on time and to sequence multiple fluoresced beams corresponding to each primary color to the DMD to generate a time-multiplexed full color pixel image.

18. The image generation system of claim 17, the excitation energy source further comprising:
an emitter to emit the light of the excitation spectrum;
a collimator optically coupled to the emitter to receive and collimate the emitted light; and
a top-hat beam shaper optically coupled to the collimator to receive the emitted light and to homogenize the emitted light by converting an area distribution of the emitted light from a substantially Gaussian distribution to a substantially top-hat distribution, the top-hat beam shaper selected from a group of optical devices consisting of an optical diffuser, an analytical aspheric lens, and a light pipe.

19. The image generation system of claim 17, further comprising:
a switchable Bragg grating optically coupled to the condensing and collimation optical element group to pass light of wavelengths corresponding to the excitation spectrum during first predetermined time periods and to reflect the light of wavelengths corresponding to the excitation spectrum during second predetermined time periods in order to prevent unconverted excitation energy from passing into an output beam during the second predetermined time periods.

\* \* \* \* \*